(12) United States Patent
Shimada et al.

(10) Patent No.: US 6,169,787 B1
(45) Date of Patent: *Jan. 2, 2001

(54) TELEPHONE TRANSACTION SUPPORT SYSTEM

(75) Inventors: Takashi Shimada; Kiyofumi Akita; Shigeru Idei; Hisashi Fujita, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/873,720

(22) Filed: Jun. 12, 1997

(30) Foreign Application Priority Data

Jun. 14, 1996 (JP) .................................................. 8-154503
Mar. 19, 1997 (JP) .................................................. 9-066926

(51) Int. Cl.$^7$ .......................... H04M 1/64; H04M 11/00; H04M 3/00
(52) U.S. Cl. ................................. 379/91.01; 379/88.01; 379/91.02; 379/265
(58) Field of Search .................................. 379/88.01, 74, 379/201, 210, 212, 214, 90.01, 91.01, 93.02, 91.02, 93.05, 93.12, 34, 260–267; 380/24, 25, 49; 705/23, 26, 27

(56) References Cited

U.S. PATENT DOCUMENTS

| | | | |
|---|---|---|---|
| 3,956,615 | * 5/1976 | Anderson et al. | 235/61.7 |
| 4,897,867 | * 1/1990 | Foster et al. | 379/94 |
| 4,969,185 | * 11/1990 | Dorst et al. | 379/209 |
| 5,008,930 | * 4/1991 | Gawrys et al. | 379/210 |
| 5,101,425 | 3/1992 | Darland et al. | 379/34 |
| 5,136,633 | * 8/1992 | Tejada et al. | 379/91 |
| 5,220,501 | * 6/1993 | Lawlor et al. | 364/408 |
| 5,239,460 | 8/1993 | LaRoche | 364/401 |
| 5,287,403 | * 2/1994 | Atkins et al. | 379/144 |
| 5,291,551 | 3/1994 | Conn et al. | 379/265 |
| 5,345,501 | * 9/1994 | Shelton | 379/89 |
| 5,455,407 | * 10/1995 | Rosen | 235/380 |
| 5,465,286 | 11/1995 | Clare et al. | 379/34 |
| 5,479,479 | * 12/1995 | Clitherow | 379/144 |
| 5,533,103 | 7/1996 | Peavey et al. | 379/69 |
| 5,577,112 | 11/1996 | Cambray et al. | 379/216 |
| 5,661,781 | * 8/1997 | DeJagger | 379/67 |
| 5,703,943 | * 12/1997 | Otto | 379/265 |
| 5,757,904 | * 5/1998 | Anderson | 379/265 |
| 5,774,663 | * 6/1998 | Randle et al. | 395/200.34 |
| 5,825,856 | * 10/1998 | Porter et al. | 379/93.12 |
| 5,970,471 | * 10/1999 | Hill | 705/26 |

FOREIGN PATENT DOCUMENTS

| | | |
|---|---|---|
| 0 568 770 | 11/1993 | (EP) . |
| 0 644 510 | 3/1995 | (EP) . |
| 2 169 473 | 7/1986 | (GB) . |
| 96/12350 | 4/1996 | (WO) . |

* cited by examiner

Primary Examiner—Scott L. Weaver
Assistant Examiner—Allan Hoosain
(74) Attorney, Agent, or Firm—Staas & Halsey LLP

(57) ABSTRACT

A telephone transaction support system includes a transaction register unit for registering, in a database, contents of a transaction requested by a customer over a telephone, and a deciding unit for deciding on an approval support unit among a plurality of approval support units at random, the approval support unit being used to approve contents of a transaction, whereby the approval support unit decided on at random is used to approve the transaction registered in the database. A telephone transaction support system which supplies to an operator information regarding a transaction in a conversation with a customer over a telephone includes a detecting unit for detecting an actual state of service of an operator dealing with the customer based on the information supplied thereto, and an estimate data generating unit for generating estimate data based on the actual state of the service of the operator detected by the detecting unit.

25 Claims, 16 Drawing Sheets

FIG. 6

| APPROVER ID CODE | APPROVAL TERMINAL ADDRESS |
|---|---|
| S1 | ADD - 1 (13(1)) |
| S2 | ADD - 2 (13(2)) |

FIG. 10

APPROVAL LIST

| TRANSACTION NO. | TRANSACTION | AMOUNT | OPERATOR NAME | APPROVER | STATE |
|---|---|---|---|---|---|
| 00000010 | TRANSFER | 1,000,000 | A | $S_1$ | NOT APPROVED |
| 00000015 | XXX | XXX,XXX,XXX | XX | $S_1$ | NOT APPROVED |
| 00000023 | XXX | XXX,XXX,XXX | XX | $S_1$ | NOT APPROVED |
| 00000031 | XXX | XXX,XXX,XXX | XXX | $S_1$ | NOT APPROVED |

FIG. 12

| CONFIRMATION LEVEL | CONDITION | CONFIRMATION STYLE |
|---|---|---|
| LEVEL A | AMOUNT OF TRANSACTION MONEY IS NOT LESS THAN 10,000,000 YEN | CONFIRMATION OF CONVERSATION USING VOICE |
| LEVEL B | AMOUNT OF TRANSACTION MONEY IS NOT LESS THAN 1,000,000 YES | CONFIRMATION OF PART OF CONVERSATION USING VOICE |
| LEVEL C | AMOUNT OF TRANSACTION MONEY IS LESS THAN 1,000,000 YES | CONFIRMATION USING DESCRIPTION OF CONVERSATION |

FIG. 15

| TERMINAL NO. | OPERATOR ID | OPERATOR NAME | POINTS (VALUE) | ...... | POINTS | TOTAL POINTS | NUMBER OF CONVERSATION | TOTAL OF LAST 20 VALUES |
|---|---|---|---|---|---|---|---|---|
| | | | | | | | | |

TELEPHONE TRANSACTION SUPPORT SYSTEM

BACKGROUND OF THE INVENTION (1) Field of the Invention

The present invention generally relates to a telephone transaction support system used in various transactions (e.g., banking transactions) over telephones, and more particularly to a telephone transaction support system capable of preventing injustice which may occur in processes of receiving transactions requested by customers over telephones and approving contents of the transactions.

Further, the present invention relates to a telephone transaction support system which supplies information regarding transactions to an operator in conversation with a customer over a telephone and can objectively estimate actual service of the operator to the customer in the transactions over the telephone.

(2) Description of the Related Art

In recent years, banking transactions (e.g., transactions of transfer, deposit, withdrawal and balance inquiry) over telephones have been proposed.

In such banking transactions, when a customer requests an operator in a bank over a telephone to, for example, transfer an amount of money from the customer's bank account to another's bank account, the requested transaction of transfer is executed without submitting documents, such as a request sheet, to the bank.

In the telephone transactions, such as the banking transaction using telephones as described above, since there is no sheet on which contents of each transaction are written, it is at issue how the contents of transactions received over the telephones should be confirmed and how the transaction should be approved. In addition, in processes of receiving transactions over telephones and approving the contents of the received transactions, injustice, such as alteration of contents of the transaction, may occur.

Further, a system which supplies information regarding a transaction (a housing loan, public utilities charges transfer, annuity transfer, a loan on a car, a time deposit and the like) to an operator in a conversation with a customer over a telephone has been proposed. The operator who receives a call from a customer is entrusted with how to use information supplied from the system in conversation with the customer. That is, in a case where the operator is supplied information regarding a housing loan from the system, the operator is entrusted with whether to earnestly recommend the housing loan to the customer.

Even if the above system which supplies information regarding transactions to each operator is used, since each operator is entrusted with the conversation with the customer, the quality of services to customers depends on the nature of each operator and a frame of mind of each operator. Thus, it is difficult to supply services to customers with uniform quality.

SUMMARY OF THE INVENTION

Accordingly, a general object of the present invention is to provide a novel and useful telephone transaction support system in which the disadvantages of the aforementioned prior art are eliminated.

A specific object of the present invention is to provide a telephone transaction support system which can prevent injustice from occurring in processes of receiving transactions over telephones and approving the contents of the received transactions.

The above objects of the present invention are achieved by a telephone transaction support system comprising: transaction register means for registering, in a database, contents of a transaction requested by a customer over a telephone; and deciding means for deciding on an approval support unit among a plurality of approval support units at random, the approval support unit being used to approve contents of a transaction, whereby the approval support unit decided on at random is used to approve the transaction registered in the database.

In the above system, when a transaction is requested by a customer over a telephone, contents of the transaction are registered in the database. The contents of the transaction are approved using an approval support unit decided on among a plurality of approval support units at random. The transaction having the approved contents is executed.

According to the present invention, the contents of the transaction received by an operator of a telephone are approved using an approval support unit decided on at random. Thus, the contents of the transaction received by a specific operator are prevented from being approved using a specific approval support unit. As a result, injustice is prevented from occurring in processes of receiving transactions over telephones and approving the contents of the received transactions.

In order to be able to confirm a difference between the contents of the transaction registered in the database and the contents of the transaction which is actually requested by the customer, the above telephone transaction support system may further comprise: conversation recording means for recording, in the database, contents of a conversation with the customer over the telephone in the transaction under a condition in which the contents of the conversation correspond to the transaction, whereby the contents of the transaction registered in the database are compared with the contents of the conversation when the transaction is approved using the approval support unit decided among the plurality of approval support units at random.

In order to be able to easily determine a transaction to be approved from transactions registered in the database, the above telephone transaction support system may further comprise: unit registration means for registering, in the database, information identifying the approval support unit decided on by the deciding means under a condition in which the information corresponds to transactions, whereby the transactions which should be approved by the approval support unit are retrieved from the database based on the information identifying the approval support unit.

In order to be able to assign a transaction to an approver using an approval support unit at random, the above telephone transaction support system may further comprise: table storage means for storing a table indicating relationships between the plurality of approval support units and approvers using the plurality of approval support units, wherein each approval support unit is identified by a corresponding approver indicated in the table.

Another object of the present invention is to provide a telephone transaction support system capable of supporting operators who are in conversation with a customer in uniform quality of services regarding transactions to the customer.

The above object of the present invention is achieved by a telephone transaction support system supplying to an operator information regarding a transaction in a conversation with a customer over a telephone, comprising: detecting means for detecting an actual state of service of an operator dealing with the customer based on the information supplied thereto; and estimate data generating means for generating estimate data based on the actual state of the operator detected by the detecting means.

In the system, it is detected how the operator deals with the customer over the telephone (the actual state of service of the operator to the customer) based on the information supplied from the system. The estimate data is generated based on the detected actual state of the service of the operator to the customer. A manager can educate operators regarding services to the customers over the telephones, based on the estimate data for respective operators, so that uniform estimate data items for the respective operators are obtained. As a result, the quality of services of the operators in conversation with customers can be uniform.

In order to be able to totally estimate the services of the operator to the customer, the above telephone transaction support system may further comprise: total data generating means for totaling the estimate data items generated by said estimate data generating means and obtaining total estimate data.

In order to be able to inform the operator of the quality of services of the operator to the customer, the above telephone transaction support system may comprise: determination means for determining, based on the total estimate data, whether service of the operator to the customer is proper; and informing means for informing the operator of a determination result obtained by said determination means when said determination means determines that the service of the operator to the customer is not proper.

BRIEF DESCRIPTION OF THE DRAWINGS

Other objects, features and advantages of the present invention will be apparent from the following description when read in conjunction with the accompanying drawings, in which:

FIG. 6 is a diagram illustrating a table indicating relationships between approvers and the approval terminals;

FIG. 10 is a diagram illustrating a list of transactions which should be approved;

FIG. 12 is a diagram illustrating a table indicating relationships between transaction conditions and approval levels;

FIG. 15 is a diagram illustrating an operator management table; and

DESCRIPTION OF THE PREFERRED EMBODIMENTS

A description will be given of a telephone transaction support system according to an embodiment of the present invention.

Figure 1:
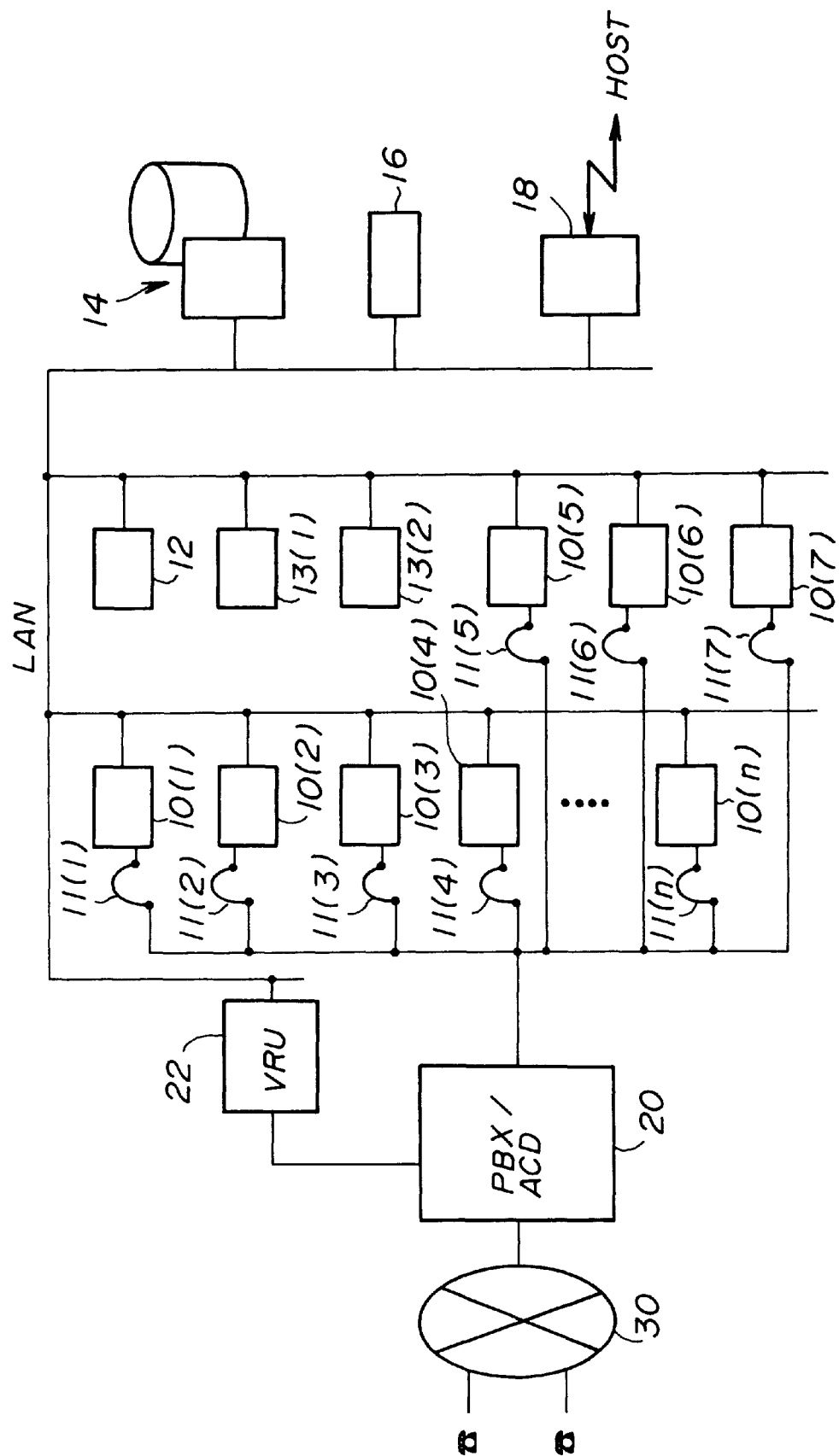
FIG. 1 is a block diagram illustrating hardware of a telephone transaction support system according to an embodiment of the present invention.

A telephone transaction support system which supports operators in banking transactions over telephones (telephone-banking transactions) is formed as shown in FIG. 1. Referring to FIG. 1, a plurality of client terminals 10(1), 10(2), . . . , 10(n), 12, 13(1) and 13(2) are connected to a LAN. Each of the client terminals 10(1), . . . and 10(n) is a terminal used to receive transactions from customers over a telephone line, and is referred to as a reception terminal. The client terminal 12 is a terminal used to monitor the system and is referred to as a monitoring terminal. Each of the client terminals 13(1) and 13(2) is a terminal used to approve banking transactions received by the reception terminals and is referred to as an approval terminal.

Further, a database server 14, a printer unit 16, a communication server 18 and a voice response unit (VRU) 22 are connected to the LAN. The database server 14 manages various types of files shared in the system. The printer unit 16 can be accessed by the respective client terminals and the database server 14. Transaction journals, forms and the like are printed out from the printer unit 16. The communication server 18 is connected to a host computer in a bank. Contents of transactions approved in the system are transmitted from the communication server 18 to the host computer. The voice response unit 22 has a function for automatically responding to calls from customers.

An exchange (PBX/ACD) 20 is connected to a public network 30. The respective reception terminals 10(1), . . . and 10(n) and the voice response unit 22 are connected to the exchange. The exchange 20 has an automatic call distributing (ACD) function so that calls from external telephones are distributed among the reception terminals 10(1), . . . and 10(n) in a predetermined algorithm.

When a call is connected to the voice response unit 22, the voice response unit 22 responds to the call with a voice in accordance with a predetermined procedure. Each of the reception terminals 10(1), . . . and 10(n) has a telephone communicating function. An operator of each of the reception terminals 10(1), . . . and 10(n) talks with a customer using a corresponding one of telephone headsets 11(1), 11(2), . . . and 11(n).

Figure 2:
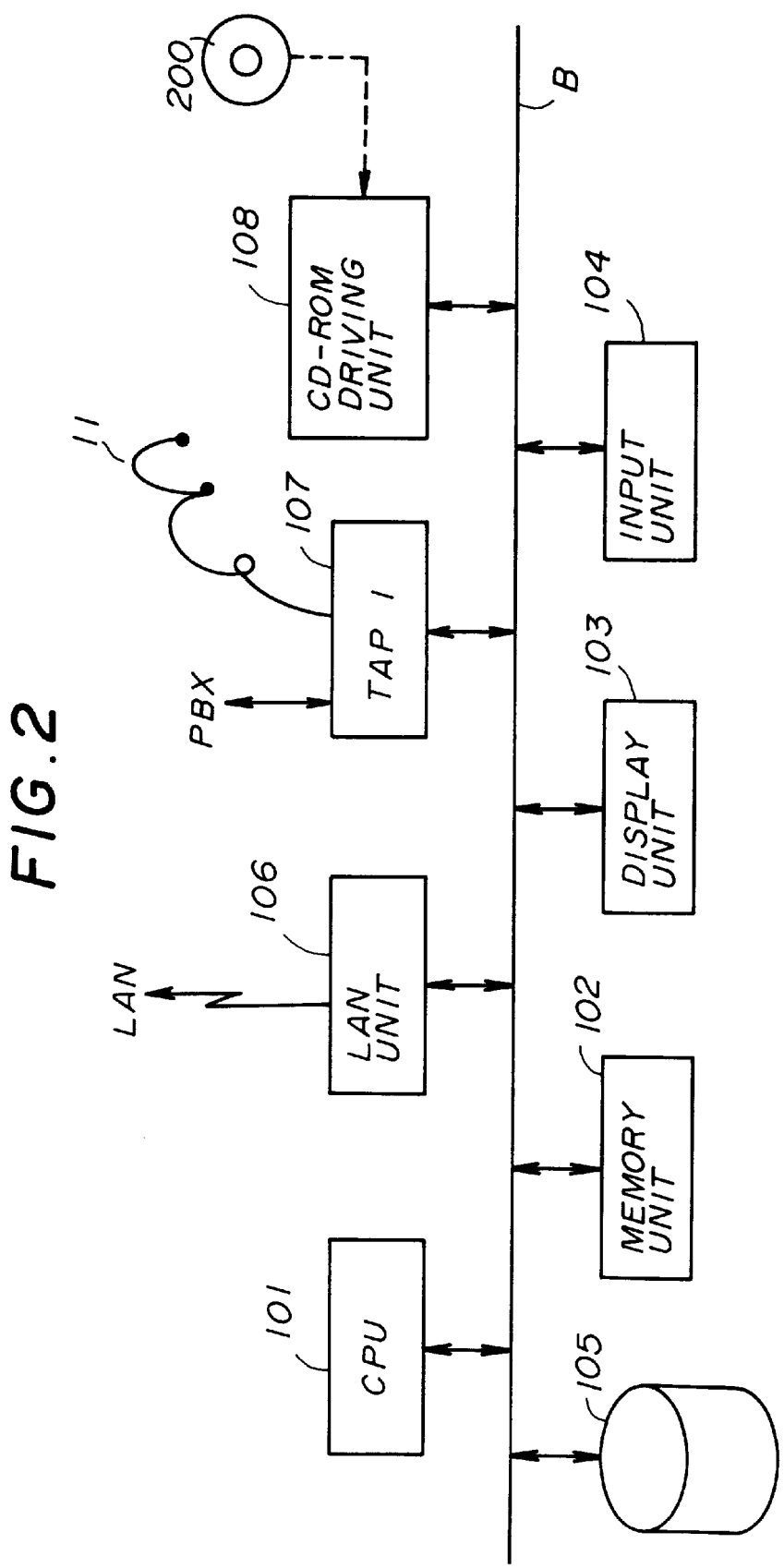
FIG. 2 is a block diagram illustrating a hardware structure of each reception terminal used in the system shown in FIG. 1.

Each of the reception terminals 10(1), . . . and 10(n) is formed as shown in FIG. 2.

Referring to FIG. 2, a reception terminal has a control unit 101 including the so-called CPU, a memory unit 102, a display unit 103, an input unit 104, a disc unit 105, a LAN unit 106, an internal telephone unit 107 and a CD-ROM driving unit 108. These units are connected to each other by a system bus B.

The control unit 101 controls the whole of the reception terminal and executes a process for the reception of transactions using the internal telephone unit 107. The memory unit 102 has memories, such as a ROM and a RAM and stores programs which are to be executed by the control unit 101 and data obtained in the processes. The display unit 103 has a CRT or an LCD (Liquid Crystal Display) panel. Various kinds of guidances and scripts for the operator and information of customers are displayed by the display unit 103. The input unit 104 has a keyboard and a mouse and is used by the operator to input information to the reception terminal.

The LAN unit 106 is connected to the LAN and communicates with the LAN. The internal telephone unit 107 (TAPI) is connected to the exchange 20 (PBX/ACD). Voice communication is performed between the internal telephone unit 107 and the exchange 20. The telephone head set 11 is connected to the internal telephone unit 107, and the operator talks with a customer using the telephone head set 11.

A CD-ROM 200 stores a program comprising program codes representing the process for the reception of the telephone transaction. The program is installed from the CD-ROM 200 set in the CD-ROM driving unit 108 to the disc unit 105. When the reception terminal is turned on, the program read out of the disc unit 105 is stored in the memory unit 102. In this state, the control unit 101 (CPU) executes the process for the reception of transactions in accordance with the program.

Figure 3:
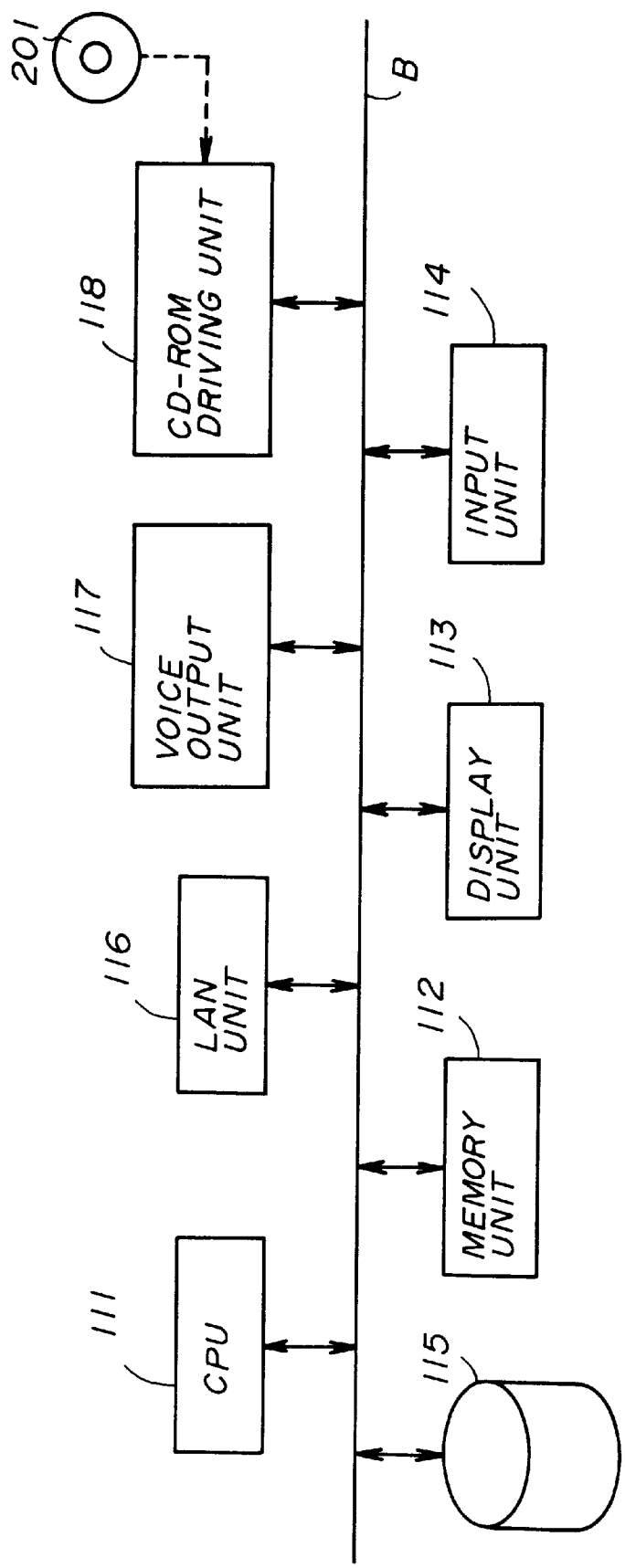
FIG. 3 is a block diagram illustrating a hardware structure of each approval terminal used in the system shown in FIG. 1.

Each of the approval terminals 13(1) and 13(2) is formed as shown in FIG. 3.

Referring to FIG. 3, an approval terminal has a control unit 111 (CPU), a memory unit 112, a display unit 113, an input unit 114, a disc unit 115, a LAN unit 116 and a CD-ROM driving unit 118 all of which are connected to a system bus B in the same manner as the reception terminal described above. The approval terminal further has a voice output unit 117 connected to the system bus B. The voice output unit 117 has a loudness speaker and outputs voice conversation information which will be described later.

A CD-ROM 201 stores a program comprising program codes representing a process for approval of transactions. The program is installed from the CD-ROM 201 set in the CD-ROM driving unit 118 to the disc unit 115 in the same manner as in the case of the reception terminal. When the approval terminal is turned on, the program is read out of the disc unit 115 and stored in the memory unit 112. The control unit (CPU) 111 executes the process for the approval of the transaction in accordance with the program.

When a call from a customer is received by the exchange 20, the call is connected to the voice response unit 22. The voice response unit 22 responds to the call with a voice in accordance with a predetermined procedure. If the customer requests a telephone transaction, the call from the customer is connected to a reception terminal. When the internal telephone unit 107 of the reception terminal receives the call from the customer, the control unit 101 of the reception terminal executes the process for the reception of transactions, in accordance with a procedure shown in FIG. 4.

Figure 4:
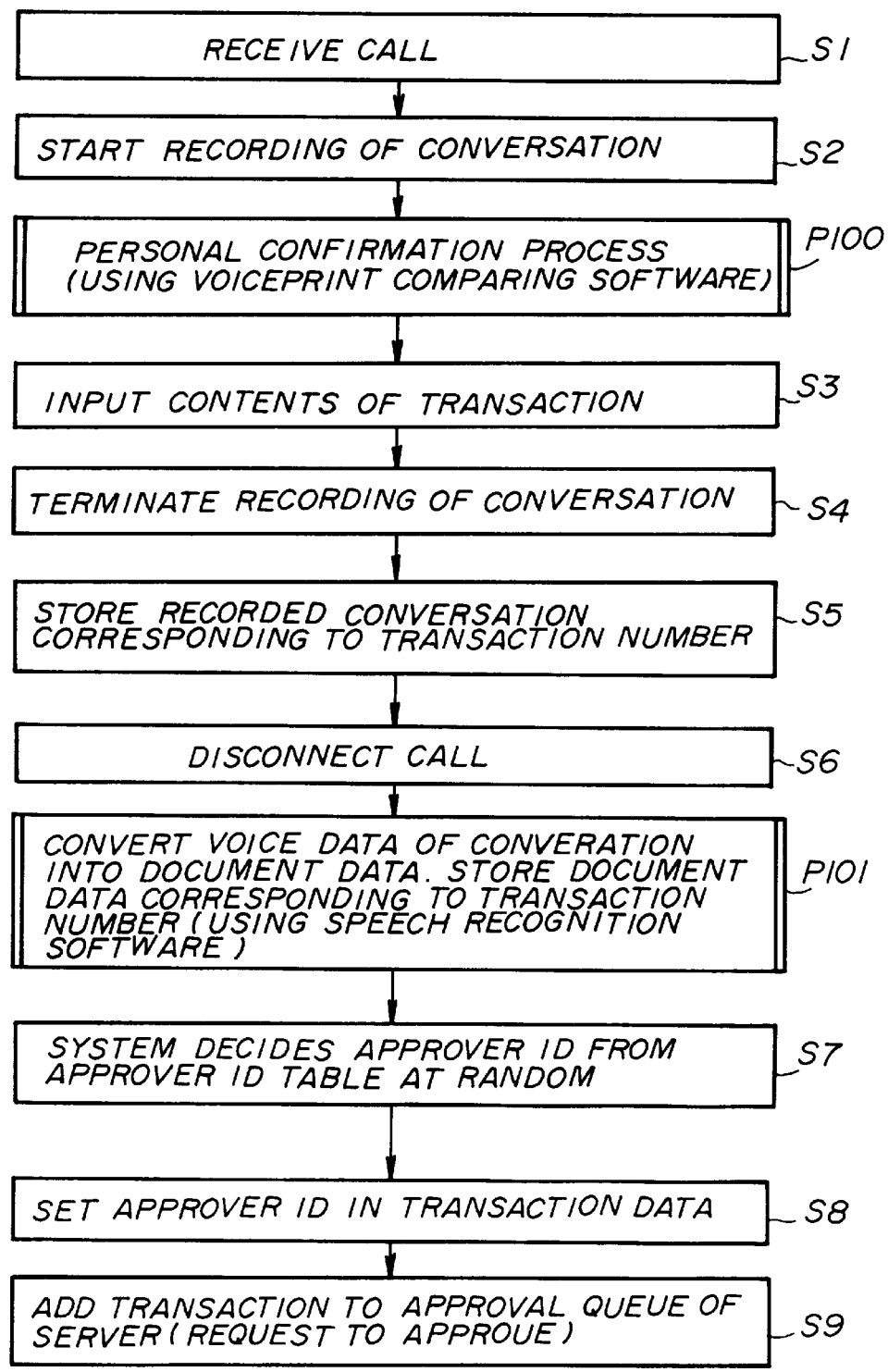
FIG. 4 is a flowchart illustrating a procedure of a process for receiving transactions executed in the reception terminal.

Referring to FIG. 4, when the control unit 101 detects that the call from the customer has been received (S1), a conversation with the customer over the telephone starts to be recorded (S2). After this, the contents of the conversation between the operator and the customer over the internal telephone 107 is recorded in the memory unit 102.

Figure 5:
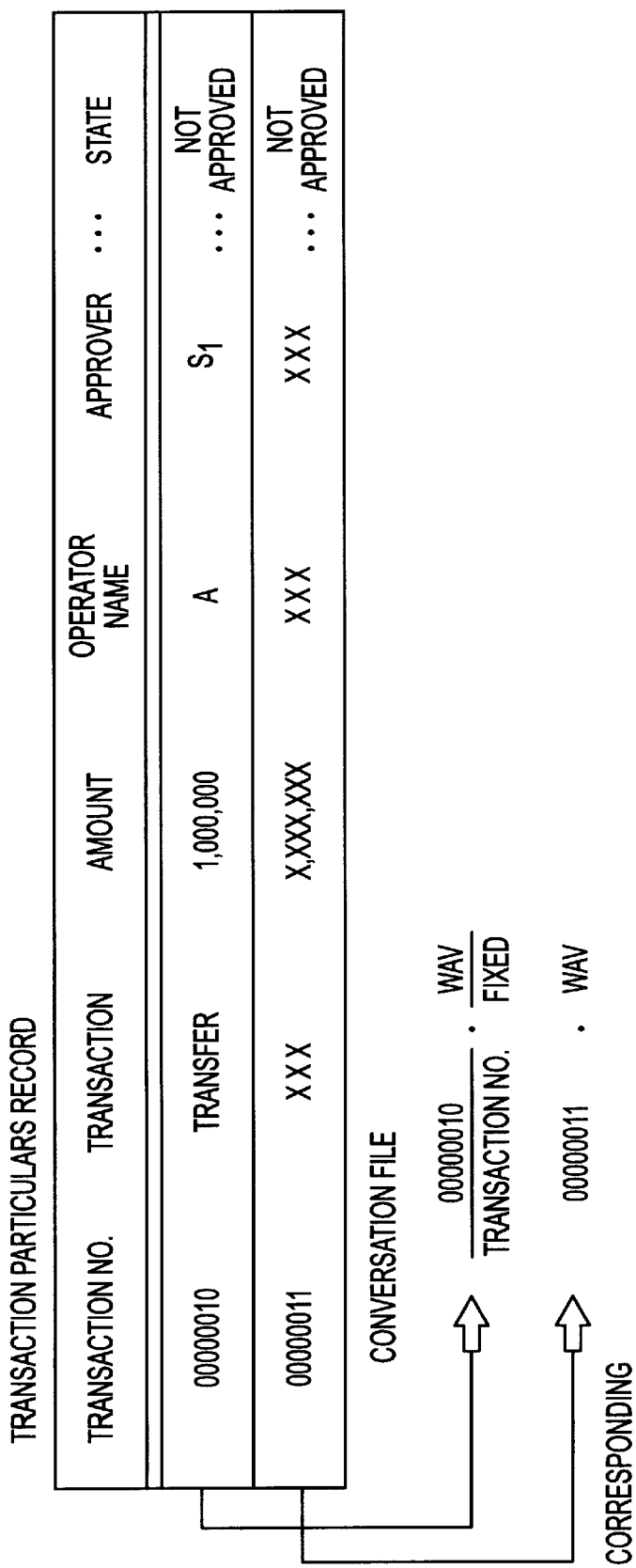
FIG. 5 is a diagram illustrating a transaction detail record and a conversation file relating to the transaction particulars record.

In a state where the conversation with the customer is being recorded, the control unit 101 executes a process (a personal confirmation process) P100 for confirming whether the customer has been registered as a person who is permitted to use the telephone-banking transactions. A detailed description of the personal confirmation process P100 will be given later. If the customer has been registered as a person who is permitted to use the telephone-banking transactions, the control unit 101 causes the display unit 103 to display guidance to the effect that contents of transactions should be input (S3). The operator who looks at the guidance asks the customer what transaction (e.g., an account transfer transaction) is requested by the customer. The operator then inputs contents of the requested transaction (a kind of transaction, an amount of money, a person in charge of the reception and the like) using the input unit 104. A transaction number identifying the transaction input by the operator is automatically decided. Transaction data indicating the contents of the transaction is stored in the memory unit 102 along with the transaction number. The transaction data is formed as a transaction particulars record as shown in FIG. 5.

As has been described above, when the contents of the requested transaction have been completely input, the control unit 101 terminates recording the conversation with the customer (S4). The control unit 101 then makes a conversation file representing contents of the recorded conversation and stores the conversation file in the memory unit 102 (S5). The conversation file is identified by, for example, (TRANSACTION NUMBER . WAV) as shown in FIG. 5 so as to be related to the transaction number assigned to the transaction. After this, the control unit 101 causes the internal telephone unit 107 to disconnect the call from the customer (S6).

When the call from the customer is disconnected, the control unit 101 executes a process P101 for converting the contents of the conversation (voice data) represented by the conversation file into document data. The process P101 is executed in accordance with a known speech recognition software. The document data is related to the transaction number and stored in the memory unit 102.

A table indicating a relationship between approvers and the approval terminals, as shown in FIG. 6, is stored in the disc unit 105. When the system is turned on, each of the approvers carries out a log-in operation in a corresponding one of the approval terminals 13(1) and 13(2). As a result, in the table shown in FIG. 6, the respective approvers and the approval terminals used by the approvers are entered. In this example shown in FIG. 6, an approver identified by an ID code S1 uses the approval terminal 13(1) and an approver identified by an ID code S2 uses the approval terminal 13(2).

Figure 16:
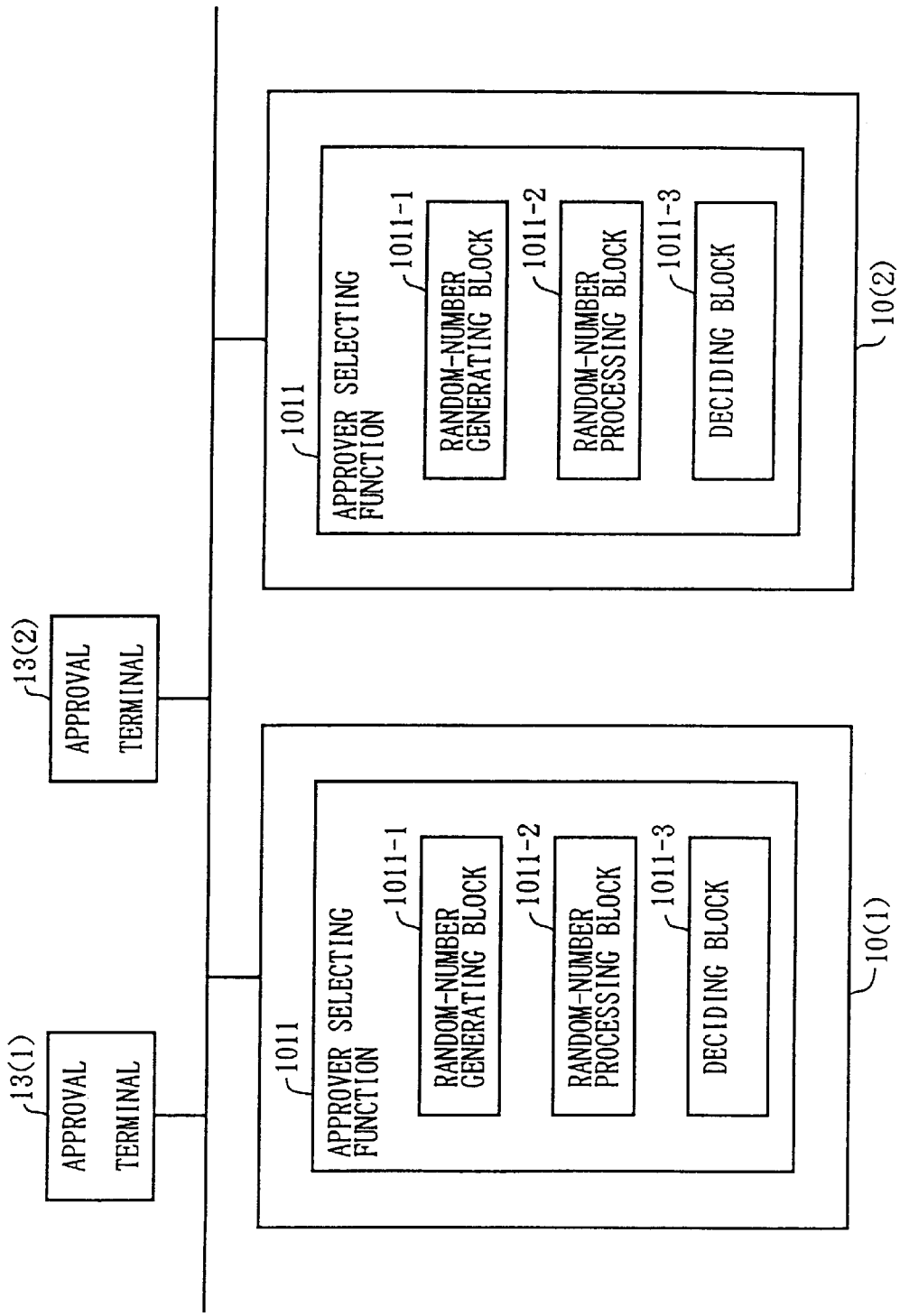
FIG. 16 is a diagram illustrating a function for deciding on an approval terminal.

The control unit 101 selects, at random, an approver to whom approval of the transaction should be requested, from among a plurality of approvers listed in the table shown in FIG. 6 (S7). Each of the reception terminals has an approver selecting function 1011, as shown in FIG. 16, for selecting an approver from a plurality of approvers. The approver selecting function 1101 corresponds to a process in step S7. Referring to FIG. 16, the approver selecting function 1011 has a random-number generating block 1011-1, a random-number processing block 1011-2 and a deciding block 1011-3. The random-number generating block 1011-1 generates a random number. As the random-number generating block 1101-1, a general random-number generating program and a dedicated program to this system may be used. The random-number processing block 1101-2 processes the random number generated by the random number generating block 1011-1. The deciding block 1011-3 decides on an approver based on a result obtained by the random-number processing block 1101-2. In a case where two approval terminals are provided in the system as in this embodiment, the random-number processing block 1101-2 divides the random number by two and obtains the remainder 1 or 0. Based on the remainder 1 or 0, an approver identified by an ID code S1 or S2 (see FIG. 6) is selected.

The approver may be settled using the random number which is not processed. In this case, a table indicating corresponding relationships between random numbers and approvers is used. With respect to the table, an approver corresponding to a random number generated by the random-number generating block 1101-1 is settled.

Further, the approver selecting function 1101 as described above may be provided in the monitoring terminal 12. In this case, in response to a request from a reception terminal, the monitoring terminal 12 selects an approver from among a plurality of approvers. Since requests from the respective reception terminals are generates at random, even if the monitoring terminal 12 selects an approver in accordance with a rule, an approver is assigned to a transaction, at random, received by a reception terminal.

An ID code of the approver who is selected as described above is set in the transaction data as shown in FIG. 5. In the example shown in FIG. 5, the approver S1 is set in the transaction data identified by the transaction number "00000010". After the approver who should approve the transaction is decided as described above, the control unit 101 communicates with the database server 14 via the LAN unit 106 so that the transaction data, the conversation file and the document file corresponding to the conversation are transmitted to the database server 14 (S9). The transaction data is added to an approval queue in the database server 14.

Figure 8:
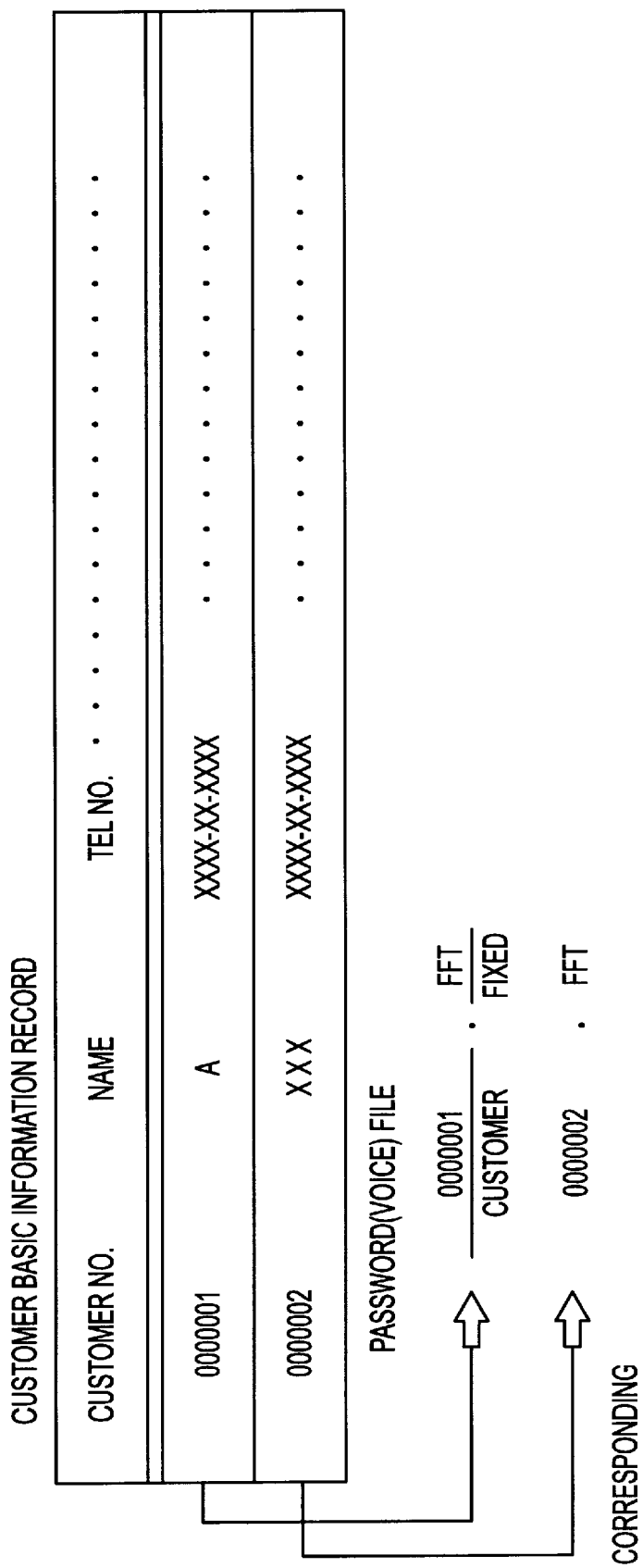
FIG. 8 is a diagram illustrating a customer basic information record and a password (voiceprint data) file.

In this system, only the registered customers are permitted the telephone-banking transaction. That is, information (a customer number, a name, a telephone number and the like) about a customer who is permitted the telephone-banking transaction has been registered in the database server 14 with a format as shown in FIG. 8. In addition, voiceprint data corresponding to speech of a predetermined word is registered, as a password identifying a customer, in the database server 14 with a format in which the voiceprint data is related to the transaction number as shown in FIG. 8.

Figure 7:
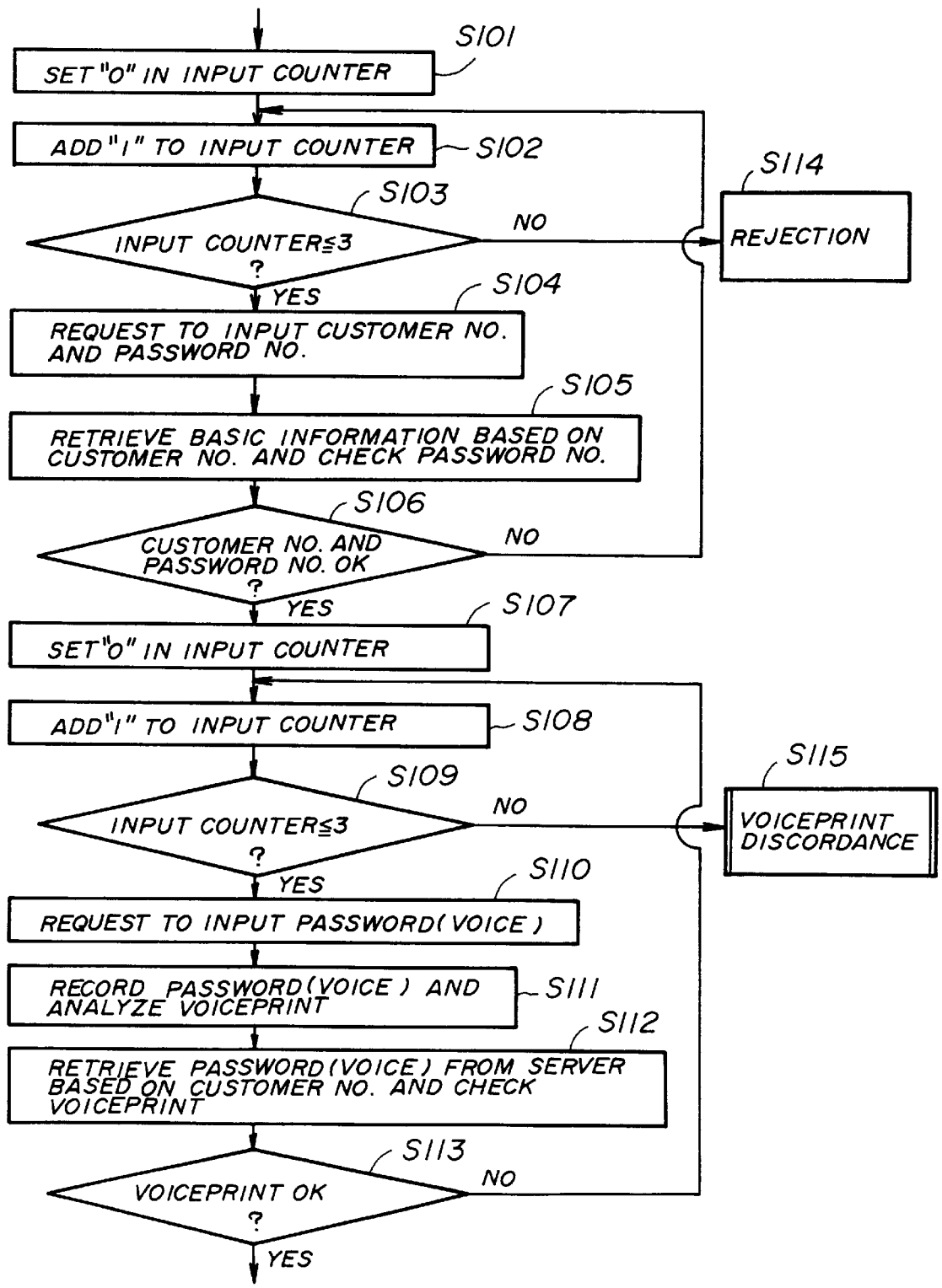
FIG. 7 is a flowchart illustrating a procedure of a process executed in reception of transactions to confirm a customer.

The personal confirmation process P100 described above is carried out in accordance with a procedure as shown in FIG. 7.

Referring to FIG. 7, the control unit 101 of the reception terminal which receives the call from the customer resets an input counter to "0" (S101), and increments the input counter by one (S102). After confirming the count value of the input counter (S103), the control unit 101 causes the display unit 103 to display guidance to request the operator to input the customer number and the password (S104). In response to the display of the guidance, the operator inputs, using the input unit 104, the customer number and the password which are told by the customer.

The control unit 101 then communicates with the database server 14 so as to instruct retrieval of customer basic information (see FIG. 7) stored in the database server 14 using the input customer number as a retrieval key (S105). The control unit 101 then determines, based on the retrieval result obtained by the database server 14, whether the input customer number and password which have been input by the customer are correct (S106).

If at least one of the customer number and the password is incorrect (No in S106), the control unit 101 increments the input counter by one (S102) and requests the operator to input the customer number and the password again (S104). The process proceeds in accordance with the same steps (S105 and S106) as in the above case. If an incorrect customer number or password is input three consecutive times (No in S103), the control unit 101 carries out a process for rejecting the requested transaction (S114). For example, a message to the effect that the transaction is not allowable due to the incorrect password and/or the customer number is displayed by the display unit 103.

In the processes described above, if it is determined that the customer number and the password are correct (Yes in S106), the control unit 101 resets the input counter to "0" (S107) and then increments the input counter by one (S108). After confirming the count value of the input counter (Yes in S109), the control unit 101 causes the display unit 103 to display guidance to urge the operator to speak the predetermined word corresponding to the password information in the system (S110). The operator who looks at the guidance requests the customer to speak the predetermined word.

In response to the request from the operator, the customer speaks the predetermined word corresponding to the registered password information. At this time, the control unit 101 records, in the memory unit 102, audio data corresponding to the predetermined word obtained over the telephone (S111). The audio data stored in the memory unit 102 as has been described above is applied with the voiceprint analysis in the same manner as in the case of registration of customer. As a result, the voiceprint data (the FFT spectrum of voice and data representing the pitch, tone and the like) is obtained (S111).

After this, the control unit 101 communicates with the database server 14 so as to instruct retrieval of the password information (see FIG. 8) stored in the database server 14 using the input customer number as a retrieval key (S112). The database server 14 obtains, as a retrieving result, password information corresponding to the customer number and transmits the retrieved password information to the reception terminal via the LAN. The control unit 101 of the reception terminal which receives the password information compares the voiceprint data which has been obtained as a result of the voiceprint analysis and the received password information (voiceprint data) (S113). The control unit 101 then determines, based on the comparison result, whether the voiceprint data obtained as the analyzing result of the voiceprint analysis corresponds to the received password information. As a result, when it is determined that the voiceprint data corresponds to the received password information (Yes in S113), the control unit 101 recognizes that the customer has been registered in the system, so that the process proceeds to step S3 shown in FIG. 4.

On the other hand, if it is determined that the voiceprint data does not correspond to the received password information (No in S113), it is not confirmed that the customer has been registered in the system and the voiceprint comparing process is performed again. That is, the input counter is incremented by one (S108) and the customer is requested to speak the predetermined word corresponding to the registered password information (S110). The process is then performed in accordance with the same steps (S111, S112 and S113) as in the above case.

In a case where it is continuously determined three times that the voiceprint data does not correspond to the password information (No in S109), the control unit 101 causes the display unit 103 to display a message to the effect that the voiceprint data does not correspond to the registered password information (S115). The operator who looks at the message displayed by the display unit 103 informs the customer of this matter. The operator further confirms, with the customer over the telephone, whether the information (birthday, address, family of the customer and the like) regarding the customer displayed on the screen of the display unit 103 is correct, that is, whether the person talking with the operator is the customer identified by the customer number. If the operator confirms that the person talking with the operator over that telephone is the customer identified by the customer number, the reception of the requested transaction is allowable.

Contents of the transactions received by the respective reception terminals as has been described above are successively stored in the database server 14 and transactions which have not yet been approved are successively added to the queue (see steps S7, S8 and S9 shown in FIG. 4). In this state, in each of the approval terminals 13(1) and 13(2), the approving process for each of the transactions is performed in accordance with a procedure as shown in FIG. 9.

Figure 9:
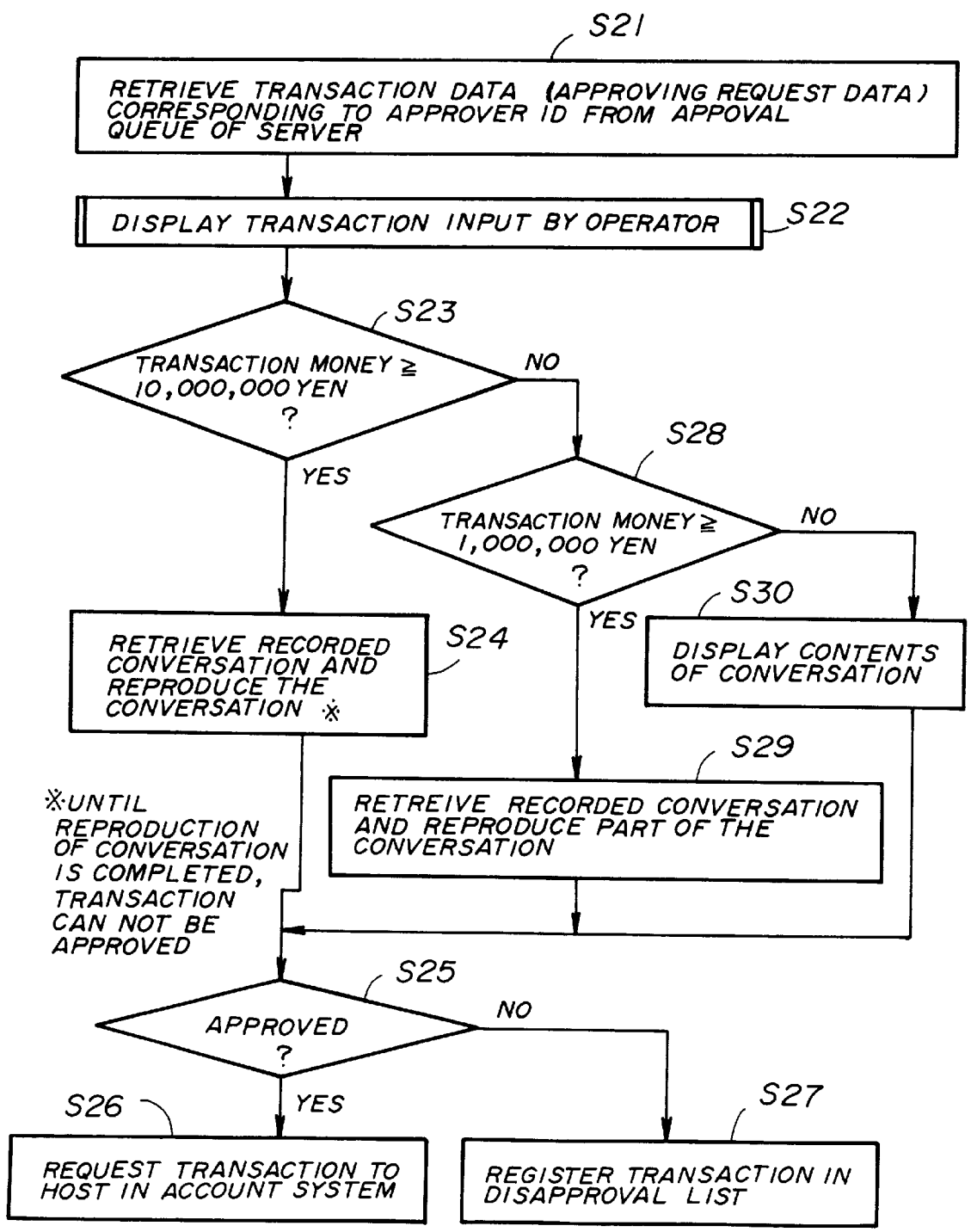
FIG. 9 is a flowchart illustrating a procedure of a process executed in the approval terminal.

Referring to FIG. 9, the control unit 111 of an approval terminal communicates with the database server 14 via the LAN so as to instruct to retrieve, from the queue, transactions which should be approved by an approver who is decided as the approver corresponding to the approval terminal in the table shown in FIG. 6 (S21). The control unit 111 of the approval terminal which receives the retrieval result from the database server 14 causes the display unit 113 to display a list of transaction data as shown in FIG. 10 (S22). The transaction data represents contents of the transactions which are included in the retrieval result as the transactions to be approved (S22).

Figure 11:
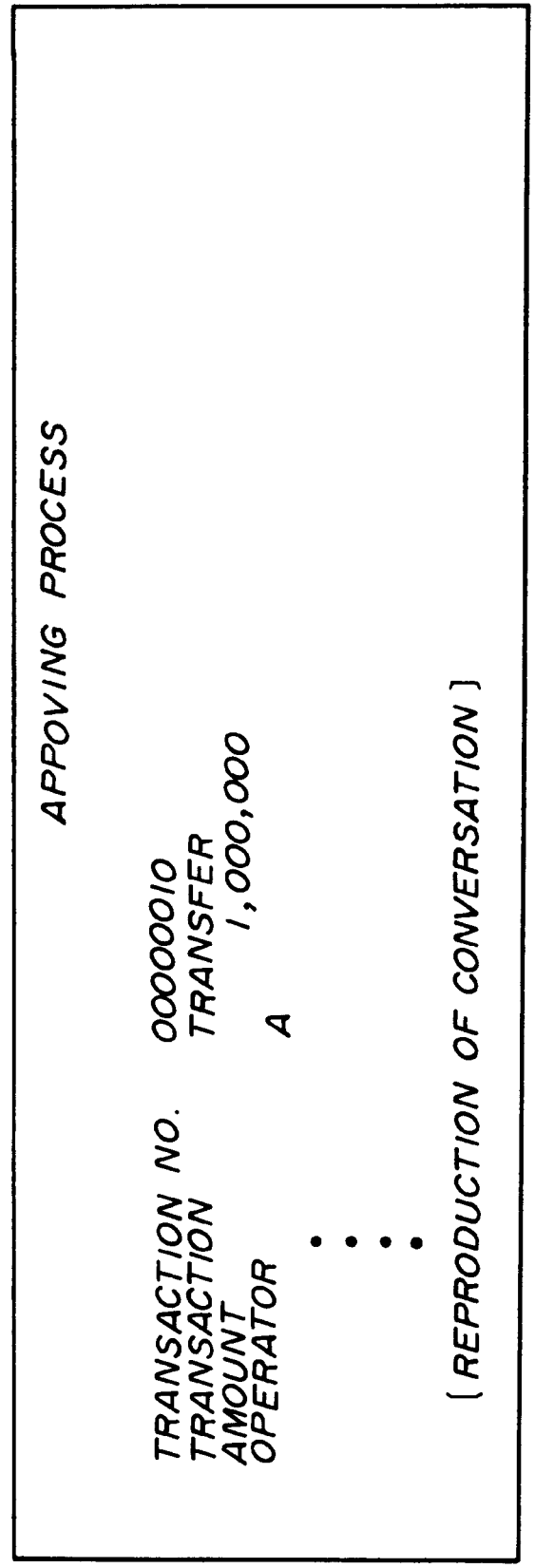
FIG. 11 is a diagram illustrating contents of a transaction which should be approved.

In this state, the approver selects one of the transactions displayed on the screen of the display unit 113 using the input unit 114 (the mouse). In response to this selecting operation, a window indicating contents of the selected transaction appears, as shown in FIG. 11, on the screen of the display unit 113. The approver looks at the contents of the selected transaction and determines whether the contents of the transaction is approved. At this time, when the approver carries out a click operation of the mouse (the input unit 114) to select a button for playback of the conversation, the control unit 111 checks a confirmation level of the transaction (S23 and S24).

In each of the approval terminals, confirmation levels for respective kinds of transactions are defined as shown in FIG. 12. In this example shown in FIG. 12, a confirmation level A is set for a transaction under a condition in which an amount of transaction money is not less than 10,000,000 yen. A confirmation level B is set for a transaction under a condition in which an amount of transaction money is not less than 1,000,000 yen. A confirmation level C is set for a transaction under a condition in which an amount of transaction money is less than 1,000,000 yen. For the transaction having the confirmation level A, the whole of the conversation with the customer over the telephone in the transaction must be confirmed using voice. For the transaction having the confirmation level B, a part of the conversation with the customer over the telephone in the transaction must be confirmed using voice. For the transaction having the confirmation level C, the conversation with the customer may be confirmed using a description (writing) of the conversation.

When it is determined that the transaction has the confirmation level A (Yes in S23), the control unit 111 communicates with the database server 14 so as to instruct retrieval of the conversation file (see FIG. 5) corresponding to the transaction number identifying the transaction (S24). When the control unit 111 receives the conversation file retrieved from the database server 14, the control unit 111 transmits the audio data in the conversation file to the voice output unit 117. As a result, the voice output unit 117 outputs contents of the conversation in the reception of the transaction using voice. The approver determines, based on the contents of the transaction displayed by the display unit 113 and the contents of the conversation output by the voice output unit 117, whether the transaction should be approved.

When the control unit 111 determines that the transaction has the confirmation level B (Yes in S28), the conversation file corresponding to the transaction is retrieved from the database server 14 in the same manner as in the case of the confirmation level A (S29). The control unit 111 then transmits a predetermined part of the audio data in the conversation file to the voice output unit 117. As a result, the voice output unit 117 outputs contents of a part of the conversation in the reception of the transaction using voice. The approver determines, based on the contents of the transaction displayed by the display unit 113 and the contents of the part of the conversation output by the voice output unit 117, whether the transaction should be approved.

When it is determined that the transaction has the confirmation level C (No in S28), the control unit 111 communicates with the database server 14 so as to instruct retrieval of a document file describing the contents of the conversation and corresponding to the transaction number identifying the transaction (S30). When the control unit ill receives the document file retrieved from the database server 14, the control unit 111 causes the display unit 113 to display the contents of the transaction and the contents of the conversation described by the document file in a predetermined window. The approver determines, based on the contents of the transaction and the conversation displayed by the display unit 113, whether the transaction should be approved.

When based on the determination as described above, the approver carries out an approval operation using the input unit 114 (Yes in S25), the control unit 111 communicates with the database server 14 to request to transmit the transaction data to a host computer in an account system (S26). The database server 14 which receives this request transmits the transaction data to the host computer in the account system via the communication server 18. As a result, the host computer executes the transaction in accordance with the received transaction data.

On the other hand, when the approver carries out an operation for disapproval of the transaction (No in S25), the control unit 111 registers the transaction data in a disapproval list (S27). The transactions registered in the disapproval list are printed out by the printer unit 16 after the services for one item of data are completed.

In the system as has been described above, for each of the transactions received by the respective reception terminals, the approval process is performed in an approval terminal selected from among a plurality of approval terminals at random. That is, a case where a transaction received by a specific operator is approved by a specific approver can be avoided.

In addition, to approve the transaction, the contents of the conversation with the customer over the telephone in the reception of the transaction is confirmed. Thus, it can be easily confirmed whether the contents of the received transaction accurately corresponds to a transaction requested by the customer. Further, the confirmation level (details of confirmation) for the conversation which should be confirmed is controlled in accordance with an amount of transaction money in the transaction, so that the contents of the transaction of a small amount of transaction money can be confirmed easily.

Figure 13:
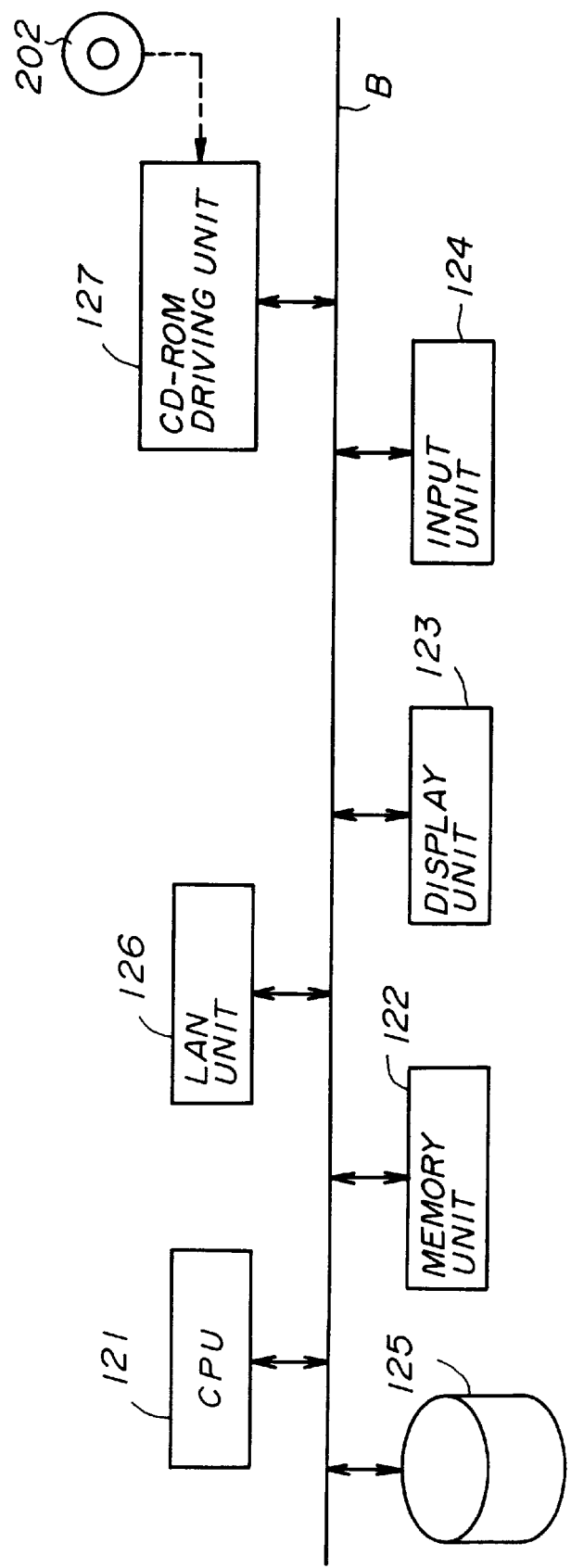
FIG. 13 is a block diagram illustrating a monitoring terminal in the system shown in FIG. 1.

The monitoring terminal 12 shown in FIG. 1 is formed as shown in FIG. 13.

Referring to FIG. 13, the monitoring terminal 12 has a control unit 121 (CPU), a memory unit 122, a display unit 123, an input unit 124, a disc unit 125, a LAN unit 126 and a CD-ROM driving unit 127 which are connected to a system bus B in the same manner as those in each of the reception terminals.

In a CD-ROM 202, a program describing a process for monitoring the state of reception services of each operator in transactions over the telephone is stored. The program is installed to the disc unit 125 via the CD-ROM driving unit 127 in the same manner as in the above case. When the monitoring terminal is turned on, the program read out of the disc unit 125 is stored in the memory unit 122. The control unit 121 then carries out the process for monitoring the sate of reception services of each operator in transactions over the telephone in accordance with the program.

In each reception terminal, the process for receiving transactions is carried out as described above (see FIG. 4 and FIG. 7). In addition, a program of a process for estimating and judging reception services of an operator in transactions over the telephone is stored in the CD-ROM 200 (see FIG. 2) which should be set in each reception terminal. This program is supplied from the CD-ROM 200 set in the CD-ROM driving unit 108 to the memory unit 102 of each reception terminal in the same manner as the program of the process for reception of the telephone transaction. The control unit 101 (CPU) executes the process for estimating and judging reception services of an operator in transactions over the telephone in accordance with the program stored in the memory unit 102.

Figure 14:
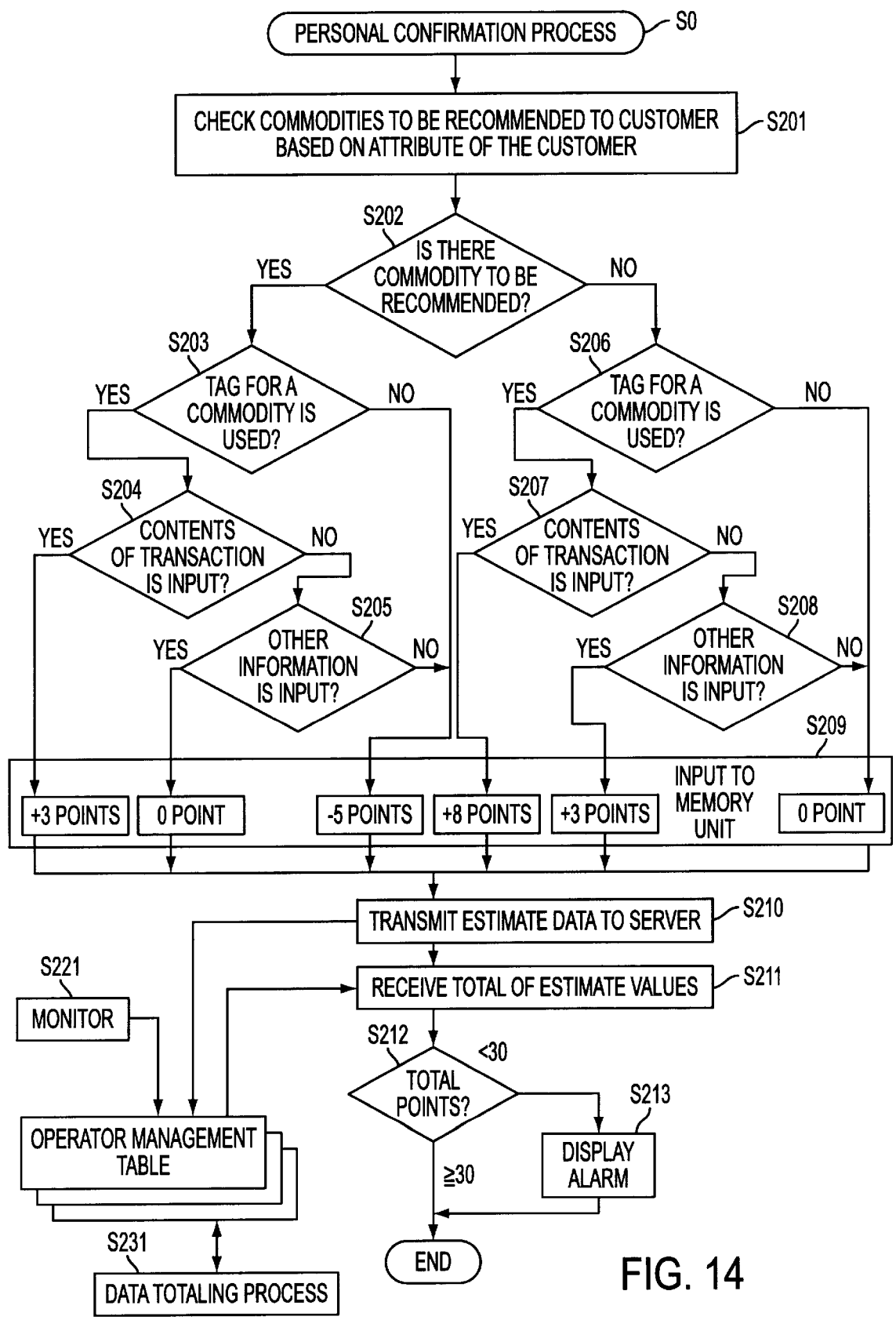
FIG. 14 is a flowchart illustrating a procedure of a process for assessing operators.

The process for estimating and judging the reception services of an operator in transactions over the telephone is carried out in accordance with a procedure as shown in FIG. 14.

Referring to FIG. 14, in a state where an operator has a conversation with a customer, the control unit 101 performs the process (the personal confirmation process) for confirming whether the customer has been registered as a person who is permitted to make the banking transaction over the telephone (S0). In a case where the customer has been registered as the person permitted to make the banking transaction over the telephone, the control unit 101 causes the display unit 103 to display guidance for inputting the contents of a transaction. The operator asks the customer about a requested transaction (e.g., an account transfer transaction) and inputs the contents (the kind of transaction, an amount of dealing money, the person in charge of the customer and the like) of the requested transaction using the input unit 104.

After this, in the system, the process for the reception of the requested transaction and the process for approval of the requested transaction are carried out, and the host computer which communicates with the system executes the requested transaction, as described above.

Further, the control unit 101 of the reception terminal at which the operator talks with the customer over the telephone, after completing the process for the reception of the requested transaction, retrieves commodities (a housing load, public utilities charges transfer, annuity transfer, a loan on a car, a time deposit and the like) which may be suitable for the customer from the database server 14, based on attributes (age, an annual income, a family make-up and the like) of the registered customers (S201). A database in which commodities which may be suitable for customers are arranged based on the attributes of the registered customer has been stored in the database server 14.

As a result of the above retrieval, if there is at least one commodity which should be recommended to the customer as a commodity suitable for the customer (Yes in S202), the control unit 101 causes the display unit 103 to display the commodity on the screen. In this state, the services of the operator in the transactions over the telephone are estimated as follows.

When a commodity is selected from among the commodities displayed by the display unit 103 using the mouse (the input unit 104), information (contents, features and the like) about the selected commodity is retrieved, and the information is displayed on the screen of the display unit 103. The operator explains to the customer about the selected commodity based on the displayed information over the telephone. As a result, if a transaction regarding the commodity is concluded and the operator inputs the contents of the transaction to the reception terminal, the transaction data is transmitted to the host computer after the transaction is approved in the same manner as in the above case.

In a case where the operator deals with the customer as described above, the operator performs the operation for selecting a commodity displayed on the screen (Yes in S203) and the operation for inputting the contents of the transaction regarding the selected commodity (Yes in S204). Based on these operations, the control unit 101 provides, for example, an estimate value of "+3" for the operator. That is, the estimate value of "+3" for the operator is stored in the memory unit 102 (S209).

On the other hand, in a case where although the operator explained to the customer about the selected commodity, the customer declined the transaction for the commodity, the operator may deal with the customer as follows.

First, the operator hears from the customer the reason why the customer declined the transaction, other commodities requested by the customer and the like and inputs information regarding the reason and the other commodities to the reception terminal. The information regarding the reason why the customer declined the transaction and the other commodities requested by the customer is stored in the database server 14 under a condition in which the information corresponds to the customer.

In this case, although the operator does not perform the operation for inputting the contents of the transaction (No in S204) after selecting a commodity displayed on the screen (Yes in 203), the operator performs the operation for inputting the reason why the customer declined the transaction and the other commodities requested by the customer (Yes in S205). Based on information regarding the operations, the control unit 101 provides, for example, the estimate value of "0" for the operator. That is, the estimate value of "0" for the operator is stored in the memory unit 102 (S209).

Second, after the customer declines the transaction, the operator does not hear the reason why the customer declines the transaction. In this case, although the operator performs the operation for selecting a commodity displayed on the screen (Yes in S203), the operator performs neither the operation for inputting the contents of the transaction (No in S204) nor the operation for inputting the reason why the customer declined the transaction (No in S205). Based on information regarding the operations, the control unit 101 provides, for example, the estimate value of "−5" for the service of the operator to the customer. That is, the estimate value of "−5" for the operator is stored in the memory unit 102 (S209).

Further, in a case where although commodities which should be recommended to the customer are displayed on the screen of the display unit 103, the operator does not deal with the customer and disconnects the call from the customer, the control unit 101 provides, for example, the estimate value of "−5" for the service of the operator to the customer based on the operator not performing the operation for selecting a commodity displayed on the screen (S209). That is, the estimate value of "−5" for the operator is stored in the memory unit 102.

In a case where it is determined, based on a retrieval result in the step S201, that there is no commodity to be recommended (No in S202), the services of the operator to the customer is estimated as follows.

Although there is no commodity recommended by the system, the operator obtains, based on information in a conversation with the customer over the telephone, a commodity which may be recommended to the customer. In this case, when the operator performs an operation for specifying information regarding the commodity, the control unit 101 reads the information regarding the commodity from the database server 14 and causes the display unit 103 to display the information. In this state, the operator explains to the customer about the commodity over the telephone, based on the displayed information. If the transaction for the commodity is concluded and the operator inputs the contents of the transaction to the reception terminal, the contents of the transaction are transmitted to the host computer after being approved, in the same manner as in the above case.

In a case where the operator deals with the customer as described above, based on the above operations of the operator (Yes in S206 and Yes in S207), the control unit 101 provides, for example, the estimate value of "+8" for the service of the operator to the customer (S209). The estimate value of "+8" for the operator is stored in the memory unit 102.

On the other hand, although the operator explains to the customer about the commodity, the transaction for the commodity may not be concluded. In this case, the operator may perform an operation for inputting the reason why the customer declines the transaction and other commodities which are requested by the customer. In this case, based on the operations of the operator (Yes in S206 and No in S207), the control unit stores, for example, the estimate value of "0" for the operator in the memory unit 102 (S209).

Further, when there is no commodity recommended by the system, the operator may disconnect the call from the customer. In this case, based on the fact that there is no operation for inputting information regarding a commodity (No in S206), the control unit 101 stores, for example, the estimate value of "0" in the memory unit 102 (S209).

Every time the operator deals with the customer over the telephone, the estimate values for the operator are stored in the memory unit 102 as has been described above. The control unit 101 reads out the estimate values from the memory unit 102. The estimate values are transmitted from the LAN unit 106 to the database server 14 along with an ID of the operator and the number of the reception terminal (S210). The database server 14 is provided with an operator management table 1 as shown in FIG. 15. That is, the estimate values transmitted from the reception terminal are described in a record identified by the ID of the operator and the number of the reception terminal.

In the operator management table 1, every time an estimate value is stored, a "NUMBER OF CONVERSATIONS" is incremented by one. As a result, the history of the estimate values for each operator is described in the operator management table 1. Further, the database server 14 totals the estimate values for each operator for the last twenty times, and the total of estimate values is described in the operator management table 1 (S231 shown in FIG. 14).

After the estimate values for each operator is transmitted to the database server 14, the total of estimate values for the last twenty times is returned from the database server 14 to the reception terminal. When the reception terminal receives the total of the estimate values (S211), the control unit 101 determines whether the total of the estimate values is equal to or greater than "30" (S212). If the total of the estimate values does not reach "30", the control unit 101 causes the display unit 103 to display an alarm mark on a predetermined area of the screen (S213).

In the case where the alarm mark is displayed, the operator of the reception terminal can recognize that services for customers were not completely suitable for the customers. Thus, each operator is educated for services of the transactions over the telephone in actual operations.

If the total of the estimate values is equal to or greater than "30", the process is terminated without displaying the alarm mark.

In addition, the contents of the operator management table 1 (see FIG. 15) stored in the database server 14 can be read out by operations of the monitoring terminal 12. A manager operates the input unit 124 of the monitoring terminal 12 so that the total of the estimate values in the last twenty times for each operator is read out of the database server 14. The control unit 121 of the monitoring unit 12 causes the display unit 123 to display the received total of the estimate values for each operator on the screen (S221 shown in FIG. 14). Further, the monitoring unit 12 performs an output control process so that the total of the estimate values for each operator is printed out by the printer unit 16. Based on the total of the estimate values for each operator displayed by the display unit 123 and/or printed out by the printer unit 16, the manager can grasp actual states of services of each operator to customers in transactions over the telephones.

The manager then educates operators whose total of estimate values is specifically low for how to supply services to customer. As a result, the services having uniform quality can be supplied to customers by various operators.

In the above system, the method to provide the estimate values for each operator is not limited to that described above. The method to provide the estimate value for each operator can be decided in accordance with the intention of an enterprise using the system. In addition, the monitoring terminal 12 can process the estimate values and the total of the estimate values for each operator in accordance with an education policy for the operators. Based on the processed data, the services of each operator for customers can be estimated in many ways.

In the above embodiment, the programs for recording the telephone transactions and estimating the services of each operator to customers are supplied to each reception terminal using the CD-ROM 200. The program for approving the transactions is supplied to each approval terminal using the CD-ROM 201. Further, the process for monitoring the services of each operator to the customers is supplied to the monitoring terminal using the CD-ROM 202. However, the recording medium for supplying programs to each terminal is not limited to the CD-ROM as described above. The programs can be supplied to the respective terminal using other kinds of recording medium, such as floppy discs, magnetic discs, magneto-optical discs and magnetic tapes.

In the above embodiment, the telephone transaction support system is applied to the banking transaction. However, the present invention is not limited to this, and the telephone transaction support system according to the present invention can be applied to other kinds of transactions.

The present invention is not limited to the to the aforementioned embodiments, and other variations and modifications may be made without departing from the scope of the claimed invention.

What is claimed is:

1. A telephone transaction support system comprising:
    transaction register means for registering, in a database, contents of a transaction requested by a customer over a telephone; and
    deciding means for deciding on an approval support unit among a plurality of approval support units at random using random number processing, said approval support unit being used to approve contents of a transaction, whereby said approval support unit decided on at random, by random number processing, is used to approve the transaction registered in said database.

2. The telephone transaction support system as claimed in claim 1 further comprising:
    conversation recording means for recording, in said database, contents of a conversation with the customer over the telephone in the transaction under a condition in which the contents of the conversation correspond to the transaction, whereby the contents of the transaction registered in said database are compared with the contents of the conversation when the transaction is approved using said approval support unit decided among the plurality of approval support units at random.

3. The telephone transaction support system as claimed in claim 1 further comprising:
    unit registration means for registering, in said database, information identifying said approval support unit decided on by said deciding means under a condition in which the information corresponds to transactions, whereby the transactions which should be approved by said approval support unit are retrieved from said database based on the information identifying said approval support unit.

4. The telephone transaction support system as claimed in claim 3, wherein each of the plurality of approval support units has retrieval means for retrieving the contents of the transaction to be approved from said database based on the information identifying the approval support system; and
    output means for outputting the contents of the transaction retrieved by said retrieval means, whereby the contents of the transaction output by said output means are approved by the approver.

5. The telephone transaction support system as claimed in claim 1 further comprising:
    table storage means for storing a table indicating relationships between the plurality of approval support units and approvers using the plurality of approval support units, wherein each approval support unit is identified by a corresponding approver indicated in said table.

6. The telephone transaction support system as claimed in claim 1, wherein each of the plurality of approval support units has reading means for reading the contents of the transaction to be approved from said database; and
    output means for outputting the contents of the transaction read out from said database by said reading means, whereby the contents output by said output means are approved by the approver.

7. The telephone transaction support system as claimed in claim 2, wherein each of the plurality of approval support units has reading means for reading the contents of the transaction to be approved and the contents of the conversation corresponding to the transaction from said database;
    first output means for outputting the contents of the transaction read out from said database by said reading means; and
    second output means for outputting the contents of the conversation read out from said database, whereby the contents of the transaction output by said first output means and the contents of the conversation output by said second output means are compared with each other so that the contents of the transaction are approved by the approver.

8. The telephone transaction support system as claimed in claim 6, wherein each of the plurality of approval support units further has output control means for controlling contents of the conversation output by said second output means in accordance with an approval level of the transaction to be approved, the approval level of the transaction being decided based on a predetermined rule.

9. A recording medium storing a program for causing a computer to performs a process for supporting approval of a transaction requested from a customer over a telephone, said program comprising:
    first program code means for registering, in a database, contents of a transaction requested by the customer over the telephone; and
    second program code means for deciding on an approval support unit among a plurality of approval support units at random using random number processing, said approval support unit being used to approve contents of a transaction, whereby said approval support unit decided at random, by random number processing, is used to approve the transaction registered in said database.

10. The recording medium as claimed in claim 9, wherein said program further comprises:
    third program code for recording, in said database, contents of a conversation with the customer over the telephone in the transaction under a condition in which the contents of the conversation correspond to the transaction, whereby the contents of the transaction registered in said database are compared with the contents of the conversation when the transaction is approved using said approval support unit decided among the plurality of approval support units at random.

11. The recording medium as claimed in claim 9, wherein said program further comprises:
    fourth program code means for registering, in said database, information identifying said approval support unit decided on by said deciding means under a condition in which the information corresponds to transactions, whereby the transactions which should be approved by said approval support unit are retrieved from said database based on the information identifying said approval support unit.

12. A recording medium storing a program for causing a computer to perform a process for supporting approval of a transaction requested by a customer over a telephone using a database in which contents of the requested transaction are recorded, said program comprising:

reading program code means for reading out the contents of the transaction which should be approved from said database; and output control program code means for causing an output unit to output the contents of the transaction read out from said database, wherein approval of the transaction is performed by random number processing.

13. A recording medium storing a program for causing a computer to perform a process for supporting approval of a transaction requested by a customer over a telephone using a database in which contents of the requested transaction and contents of a conversation with the customer over the telephone in the transaction are recorded, said program comprising:

reading program code means for reading out the contents of the transaction which should be approved and the contents of the conversation in the transaction from said database;

first output control program code means for causing a first output unit to output the contents of the transaction read out from said database; and second output control program code means for causing a second output unit to output the contents of the conversation read out from said database, wherein approval of the transaction is performed by random number processing.

14. The recording medium as claimed in claim 13, wherein said second output control program code means has a control program code means for controlling contents of the conversation output by said second output unit in accordance with an approval level of the transaction to be approved, the approval level of the transaction being decided based on a predetermined rule.

15. A recording medium storing a program for causing a computer to perform a process for supporting approval of a transaction request by a customer over a telephone using a database in which contents of the requested transaction and information identifying the computer performing the process under a condition in which the transaction corresponds to the information identifying said computer, said program comprising:

retrieval program code means for retrieving the contents of the requested transaction to be approved from said database based on the information identifying said computer; and output control program code means for causing an output unit to output the retrieved contents of the requested transaction, wherein approval of the transaction is performed by random number processing.

16. A telephone transaction support system supplying to an operator information regarding a transaction in a conversation with a customer over a telephone, comprising:

detecting means for detecting an actual state of service of an operator dealing with the customer based on the information supplied thereto, the actual state of service including a reaction of the customer to an operator's offer and a response of the operator to the reaction of the customer; and estimate data generating means for generating estimate data based on the actual state of service of the operator detected by said detecting means, wherein approval of the transaction is performed by random number processing.

17. The telephone transaction support system as claimed in claim 16 further comprising:

total data generating means for totaling the estimate data generated by said estimate data generating means and obtaining a total estimate data.

18. The telephone transaction support system as claimed in claim 17 further comprising:

determination means for determining, based on the total estimate data, whether service of the operator to the customer is proper; and informing means for informing the operator of a determination result obtained by said determination means when said determination means determines that the service of the operator to the customer is not proper.

19. The telephone transaction support system as claimed in claim 17 further comprising:

total data storage means for storing the total estimate data generated by said total data generating means under a condition in which the total estimate data corresponds to the operator; and means for reading out the total estimate data from said total data storage means and outputting the total estimate data corresponding to the operator.

20. The telephone transaction support system as claimed in claim 16 further comprising:

estimate data storage means for storing the estimate data generated by said estimate data generating means under a condition in which the estimate data corresponds to the operator; and means for reading out the estimate data from said estimate data storage means and outputting the estimate data corresponding to the operator.

21. A telephone transaction support system, comprising:

a register storing contents of a transaction requested by a customer over a telephone; and a decision unit deciding on an approval support unit among a plurality of approval support units at random using random number processing, said approval support unit being used to approve the stored transaction.

22. A method of supporting telephone transactions, comprising:

storing contents of a transaction requested by a customer over a telephone; and deciding on an approval support unit among a plurality of approval support units at random using random number processing, said approval support unit being used to approve the stored transaction.

23. A telephone transaction support system comprising:

a plurality of reception terminals receiving a request of a transaction from a customer over a telephone; and a plurality of approval terminals approving contents of the transaction received by the reception terminals, wherein each of the reception terminals comprises:

transaction register means for registering, in a database, the contents of the transaction requested by the customer over the telephone; and deciding means for deciding one of the approval terminals at random using random number processing, said one of the approval terminals being used to approve the contents of the transaction registered in the database.

24. A telephone transaction support system comprising:

a plurality of reception terminals receiving a request for a transaction from a customer over a telephone;

a plurality of approval terminals approving contents of the transaction received by the reception terminals; and a database storing the contents of the transaction, said database being accessible by the reception terminals and the approval terminals, wherein each of the reception terminals comprises:

transaction register means for registering, in the database, the contents of the transaction requested by the customer over the telephone; and deciding means for deciding on one of the approval terminals at random using random number processing, said one of the approval terminals being used to approve the contents of the transaction registered in the database, said deciding means storing the contents for the transaction in the database in relation to said one of the approval terminals, wherein each of the approval terminals comprises display means for retrieving and displaying the contents of the transaction stored in the database.

25. A reception terminal apparatus used in a telephone transaction support system comprising:

a plurality of reception terminals receiving a request for a transaction from a customer over a telephone; and a plurality of approval terminals approving contents of the transaction received by the reception terminals, wherein each of the reception terminals comprises:

an approval terminal table registering the approval terminals that are usable to approve the contents for the transaction;

transaction register means for registering, in a database, the contents of the transaction requested by the customer over the telephone; and deciding means for deciding on one of the approval terminals at random using random number processing from among the approval terminals registered in the approval terminal table upon completion of registration of the contents of the transaction, said one of the approval terminals being used to approve the contents of the transaction registered in the database.

* * * * *